(12) United States Patent
Jachowski et al.

(10) Patent No.: US 9,481,396 B2
(45) Date of Patent: Nov. 1, 2016

(54) MOTOR VEHICLE WITH AN ADJUSTABLE SILL

(71) Applicant: Dr. Ing. h.c. F. Porsche Aktiengesellschaft, Stuttgart (DE)

(72) Inventors: Bernd Jachowski, Leonberg (DE); Oliver Fischer, Korntal (DE); Thomas Wiegand, Rutesheim (DE); Joachim Paul, Benningen a.N. (DE); Wolfgang Schuster, Rottenburg (DE); Sebastian Weber, Esslingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/818,422

(22) Filed: Aug. 5, 2015

(65) Prior Publication Data

US 2016/0039469 A1 Feb. 11, 2016

(30) Foreign Application Priority Data

Aug. 5, 2014 (DE) .................. 10 2014 111 075

(51) Int. Cl.
*B60K 37/00* (2006.01)
*B62D 25/02* (2006.01)
*B62D 25/16* (2006.01)
*B62D 35/00* (2006.01)

(52) U.S. Cl.
CPC ............. *B62D 25/025* (2013.01); *B62D 25/16* (2013.01); *B62D 35/008* (2013.01)

(58) Field of Classification Search
CPC ........... B62D 25/025; B62D 25/2036; B62D 21/157; B62D 25/04; B62D 25/02; B62D 25/082; B60N 2/4666; B61D 3/18
USPC ................. 296/209, 187.12, 193.05, 193.07, 296/203.03
See application file for complete search history.

(56) References Cited

U.S. PATENT DOCUMENTS

| | | | | |
|---|---|---|---|---|
| 3,229,993 A * | 1/1966 | Riddle | ...... | B60R 3/02 182/88 |
| 6,375,207 B1 * | 4/2002 | Dean | ...... | B60R 3/02 182/88 |
| 6,663,125 B1 * | 12/2003 | Cheng | ...... | B60R 3/02 280/166 |
| 6,942,233 B2 * | 9/2005 | Leitner | ...... | B60R 3/02 105/447 |
| 6,955,370 B2 * | 10/2005 | Fabiano | ...... | B60R 3/02 280/163 |
| 6,997,469 B2 * | 2/2006 | Lanoue | ...... | B60R 3/002 280/163 |
| 7,111,859 B2 * | 9/2006 | Kim | ...... | B60R 3/02 280/166 |
| 7,118,120 B2 * | 10/2006 | Lee | ...... | B60R 3/02 280/163 |
| 7,131,655 B2 * | 11/2006 | Schumacher | ...... | B60R 3/002 280/163 |
| 7,213,826 B2 * | 5/2007 | Chuba | ...... | B60R 3/002 280/163 |
| 7,287,770 B2 * | 10/2007 | Drabant | ...... | B60R 3/002 280/163 |
| 7,311,320 B2 * | 12/2007 | Kuntze | ...... | B60R 3/002 280/163 |

(Continued)

FOREIGN PATENT DOCUMENTS

| | | |
|---|---|---|
| DE | 3613301 | 5/1990 |
| DE | 102008019923 | 10/2009 |
| DE | 202011005504 | 12/2011 |

*Primary Examiner* — Kiran B Patel
(74) *Attorney, Agent, or Firm* — Gerald E. Hespos; Michael J. Porco; Matthew T. Hespos

(57) ABSTRACT

A motor vehicle (1) has a body (4) and a sill (3) arranged between the wheel houses (5) on a longitudinal side of the vehicle. The sill (3) has a sill element (6) that is adjustable in the lateral direction between a first end position and a second end position. At least one protruding air guiding element (7,8) is arranged on the sill element (6).

9 Claims, 1 Drawing Sheet

(56) References Cited

U.S. PATENT DOCUMENTS

| | | | | |
|---|---|---|---|---|
| 7,318,596 B2* | 1/2008 | Scheuring, III | B60R 3/02 | 280/163 |
| 7,334,807 B2* | 2/2008 | Mulder | B60R 3/002 | 280/163 |
| 7,445,221 B2* | 11/2008 | Kobayashi | B60R 3/02 | 280/163 |
| 7,469,916 B2* | 12/2008 | Watson | B60R 3/02 | 280/163 |
| 7,513,565 B2* | 4/2009 | Watson | B60R 3/02 | 280/163 |
| 7,823,896 B2* | 11/2010 | VanBelle | B60R 3/02 | 280/163 |
| 7,900,944 B2* | 3/2011 | Watson | B60R 3/02 | 280/166 |
| 7,976,042 B2* | 7/2011 | Watson | B60R 3/02 | 280/166 |
| 8,136,826 B2* | 3/2012 | Watson | B60R 3/02 | 280/163 |
| 8,833,782 B2* | 9/2014 | Huotari | B60R 3/02 | 280/163 |
| 8,939,456 B2* | 1/2015 | Shelswell | B60R 3/002 | 280/163 |
| 9,272,667 B2* | 3/2016 | Smith | B60R 3/02 | |
| 2007/0152475 A1 | 7/2007 | Harrison et al. | | |
| 2007/0267842 A1* | 11/2007 | Seibert | B60R 3/02 | 280/166 |
| 2010/0102528 A1* | 4/2010 | Stickles | B60R 3/02 | 280/163 |
| 2010/0320714 A1* | 12/2010 | Webb | B61D 23/025 | 280/166 |
| 2010/0320715 A1* | 12/2010 | Watson | B60R 3/002 | 280/166 |
| 2012/0104719 A1* | 5/2012 | Hayes | B60R 3/02 | 280/163 |

* cited by examiner

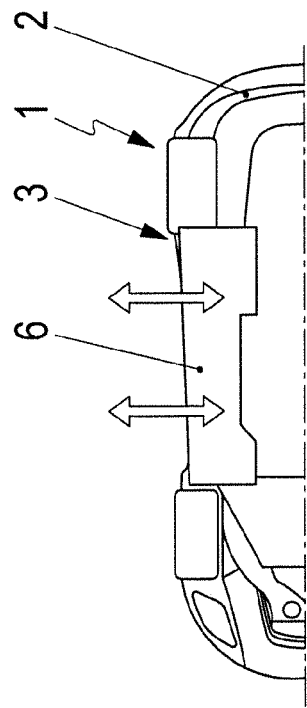
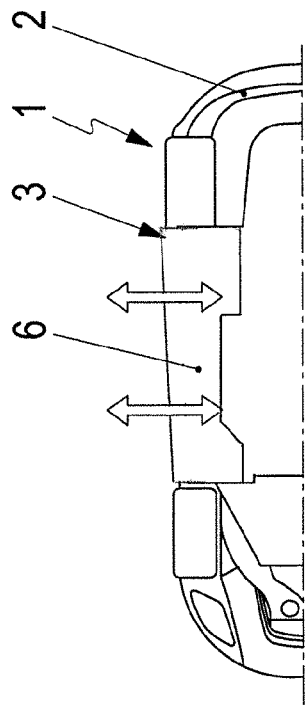
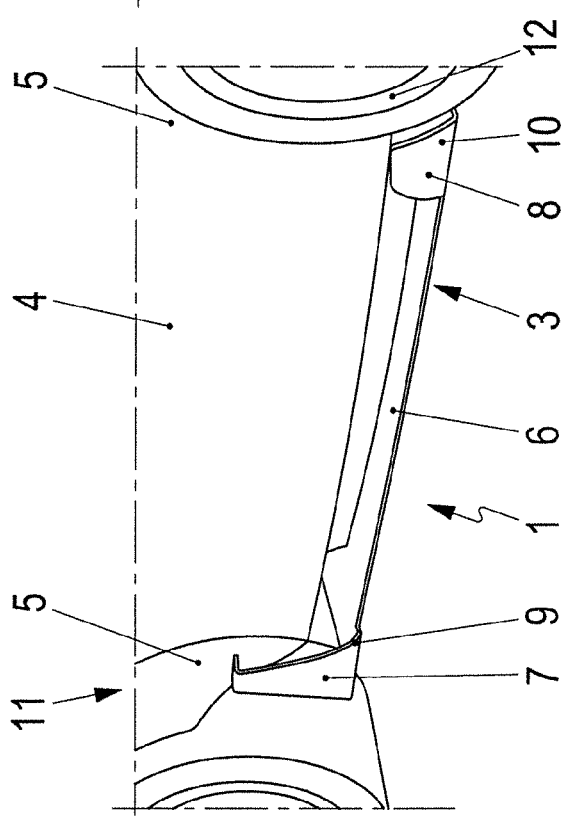
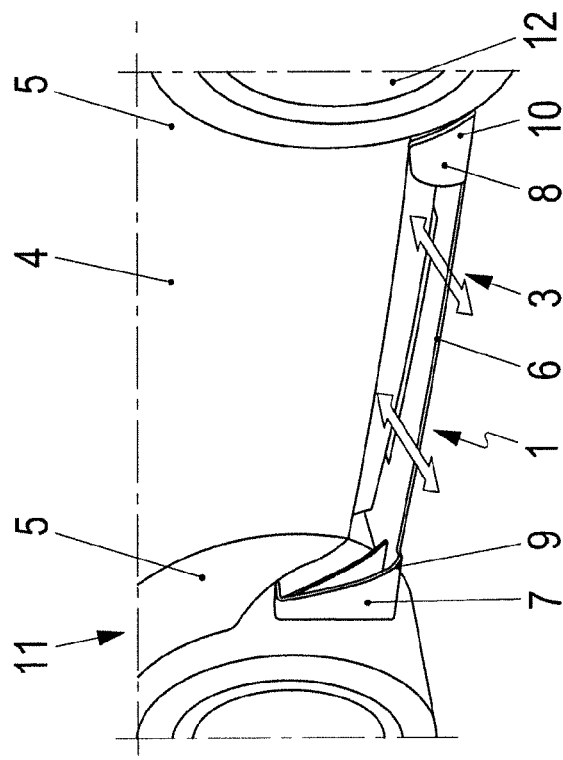

MOTOR VEHICLE WITH AN ADJUSTABLE SILL

CROSS REFERENCE TO RELATED APPLICATION

This application claims priority under 35 USC 119 to German Patent Appl. No. 10 2014 111 075.7 filed on Aug. 5, 2014, the entire disclosure of which is incorporated herein by reference.

BACKGROUND

1. Field of the Invention

The invention relates to a motor vehicle with an adjustable sill.

2. Description of the Related Art

Motor vehicles have a body with left and right sills arranged between the wheel houses. The sill reinforces the body and optionally functions as a stop for the door of the motor vehicle.

A multi-part sill has been disclosed in which the sill has a shiftable element that can be shifted between first and second positions. US 2007/0152475 A1 discloses a motor vehicle with a sill that has an element that can be adjusted between a normal position and an entry position. The sill becomes narrowed in the entry position to facilitate entry into the vehicle.

DE 20 2011 005 504 U1 discloses a vehicle with a sill having a pivotable element that can pivot between first and second positions. The pivotable element bears horizontally against the underbody in the first position and protrudes vertically down in the second position. The element gives preference to the air flow under the vehicle because said element reduces the lateral inflow under the vehicle.

DE 36 13 301 C2 discloses a sill that can be positioned outward by means of an outer covering. An inflatable bag is arranged in the outer covering and pushes the outer covering outward.

DE 10 2008 019 923 A1 discloses a flow duct for the front wheel house venting. The flow duct is formed with a pivotable flap behind the front wheel house to open or to close the flow duct. However, this configuration is highly complex.

It is an object of the invention to provide a motor vehicle with an adjustable sill that improves the flow properties of the motor vehicle and is nevertheless formed in a simple and cost-effective manner.

SUMMARY

The invention relates to a motor vehicle with a body and a sill arranged between the wheel houses on a longitudinal side of the vehicle. The sill has a shiftable sill element that is adjustable in a lateral direction between first and second end positions. The lateral direction is transverse to the longitudinal direction of the vehicle and transverse to the direction of travel. At least one protruding air guiding element is arranged on the sill element. Lateral shifting of the sill element enlarges the floor area of the motor vehicle and has a positive effect on the aerodynamic conditions of the motor vehicle. The at least one protruding air guiding element adaptively controls a further function of the motor vehicle, such as the venting of the wheel house or the incident flow to the rear wheel.

The sill element may be a substantially flat, level first air guiding element and may have second air guiding elements protruding at the front and/or rear end in the direction of travel. The second air guiding elements take on the adaptive activation of the secondary functions.

The first air guiding element that is in a first end position may be retracted under the underbody of the motor vehicle between the wheel houses. Conversely, the first air guiding element that is in a second end position protrudes laterally between the wheel houses and extends the underbody of the motor vehicle between the wheel houses. Thus, the first air guiding element influences the air flow between the vehicle floor and the carriageway so that the downforce of the motor vehicle can be improved. This, is advantageous in particular in the case of sports vehicles.

The second air guiding elements may protrude from the first air guiding element vertically or at an acute angle to the vertical direction. As a result, air guiding functions can be taken on, or air openings for wheel house venting can be controlled.

The front second air guiding element may interact with an opening for wheel house venting. The opening can be enlarged or reduced by shifting of the second air guiding element and thus can be adapted to the desired conditions.

The front second air guiding element may enlarge the wheel house venting opening to improve wheel house venting and to improve cooling of the brakes.

The front second air guiding element that is in the retracted end position may reduce or close the wheel house venting opening.

The rear second air guiding element may be configured to improve incident flow to the rear wheel. As a result, an air flow can be directed in a more targeted manner onto the rear wheel and can improve cooling of the brakes.

Laterally shiftable sill elements are arranged on both sides of the motor vehicle. Thus, the effects on both sides of the motor vehicle can simultaneously ensure improvement and uniform driving behavior.

The invention is explained in detail below using an exemplary embodiment with reference to the drawing.

BRIEF DESCRIPTION OF THE DRAWINGS

FIG. 1 is a schematic illustration of part of a motor vehicle from below with a shiftable sill in the retracted end position.

FIG. 2 is a side view of the motor vehicle with a shiftable sill in the retracted end position.

FIG. 3 is a schematic illustration of part of a motor vehicle from below with a shiftable sill in the extended end position.

FIG. 4 is a side view of the motor vehicle with a shiftable sill in the extended end position.

DETAILED DESCRIPTION

FIGS. 1 and 3 show part of a motor vehicle 1 from below with a view of the underbody 2. FIGS. 2 and 4 show part of the motor vehicle 1 between the wheel houses 5.

The motor vehicle 1 is equipped with two adjustable sill 3, only one of which is illustrated. The sills 3 advantageously are provided symmetrically on both sides of the vehicle. Each sill 3 is part of the body 4 and is arranged between the wheel houses 5 on the respective longitudinal side of the vehicle.

The sill 3 has a shiftable sill element 6 that is adjustable in the lateral direction between a first end position and a second end position. The sill element advantageously also can be adjustable into an intermediate position.

FIGS. 1 and 2 show the sill element 6 in the retracted position, whereas FIGS. 3 and 4 show the sill element 6 in the extended position. The sill element 6 is designed as a first air guiding element and in a first position is retracted under the underbody of the motor vehicle between the wheel houses 5. However, the sill element 6 protrudes laterally between the wheel houses 5 in a second position, and therefore extends the underbody of the motor vehicle between the wheel houses 5.

Air guiding elements 7, 8 protrude on the sill element 6. More particularly, the sill element 6 forms a substantially flat, level first air guiding element and second air guiding elements 7, 8 protrude at the front and/or rear end 9, 10 in the direction of travel are arranged. The second air guiding elements 7, 8 protrude vertically from the first air guiding element or at an acute angle to the vertical direction. Thus, the air guiding elements form a type of fin protruding vertically or obliquely up.

The wheel house of the front wheel has an opening 11, and the front second air guiding element 7 interacts with the opening 11 to activate the wheel house venting.

In the extended position, the front second air guiding element 7 enlarges the wheel house venting opening 11 of the front wheel house 5. In the retracted position, the front second air guiding element reduces or closes the wheel house venting opening. Thus, the underbody be enlarged, and the wheel house venting simultaneously can be improved by moving the sill element 3.

The rear second air guiding element 8 functions to improve incident flow to the rear wheel 12, as shown in in FIGS. 2 and 4. The air guiding element is positioned so that air flowing past the air guiding element advantageously is directed around the rear wheel 12.

What is claimed is:

1. A motor vehicle comprising: a body; wheel houses on a longitudinal side of the motor vehicle; and a sill arranged between the wheel houses on the longitudinal side of the motor vehicle, the sill having a shiftable sill element that is adjustable in the lateral direction between a first end position and a second end position, at least one protruding air guiding element being arranged on the sill element.

2. The motor vehicle of claim 1, wherein the sill element is a substantially flat, level first air guiding element with opposite front and rear ends spaced apart in a direction of travel of the motor vehicle, the at least one second air guiding element comprising a front second air guiding element protruding at the front end of the sill element and/or a rear second air guiding element protruding at the rear end of the sill element.

3. The motor vehicle of claim 2, wherein, in the first end position, the first air guiding element is retracted under an underbody of the motor vehicle between the wheel houses and, in a second end position, the first air guiding element protrudes laterally between the wheel houses and extends the underbody of the motor vehicle between the wheel houses.

4. The motor vehicle of claim 3, wherein the second air guiding elements protrude from the first air guiding element vertically or at an acute angle to a vertical direction.

5. The motor vehicle of claim 3, wherein the front second air guiding element interacts with a wheel house venting opening.

6. The motor vehicle of claim 5, wherein, in an extended position, the front second air guiding element enlarges the wheel house venting opening.

7. The motor vehicle of claim 6, wherein in the first end position, the front second air guiding element reduces or closes the wheel house venting opening.

8. The motor vehicle of claim 2, wherein the rear second air guiding element is configured to improve incident flow to the rear wheel.

9. The motor vehicle of claim 1, wherein the at least one laterally shiftable sill element comprises two laterally shiftable sill elements arranged respectively at opposite sides of the motor vehicle.

* * * * *